United States Patent Office 3,232,989
Patented Feb. 1, 1966

3,232,989
AROMATIC DINITRO COMPOUNDS
David E. Graham, Westfield, N.J., assignor to General
Aniline & Film Corporation, New York, N.Y., a corporation of Delaware
No Drawing. Filed Dec. 22, 1964, Ser. No. 420,447
5 Claims. (Cl. 260—580)

This application is a continuation-in-part of application Serial No. 862,457, filed December 29, 1959, now abandoned.

This invention relates to an improved method of catalytic hydrogenation of aromatic dinitro compounds to the corresponding diamines. The process of the present invention is based on the discovery that when the aromatic dinitro compound to be reduced is subjected to a pre-hydrogenation treatment with hydrogen and catalyst (which may preferably be a spent catalyst from a previous run) so that a small amount of hydrogen (up to 10% of theory) is effected and the catalyst then removed and further hydrogenation of this treated aromatic dinitro compound carried out with fresh catalyst in the absence of any untreated dinitro compound, a much higher hydrogenation rate is obtained, as well as a longer life for the catalyst. While the precise reason for these improvemens has not been fully established, and I do not wish to be limited to any theory therefor, it appears that possibly these improvements are due to some detoxification during the pre-hydrogenation step of the material being hydrogenated.

The basic conditions for the hydrogenation in accordance with the present invention, both during the prehydrogenation step and also during the final hydrogenation step, can be those known in the art of catalytic hydrogenation of aromatic dinitro compounds.

In practicing the present invention, the aromatic dinitrocompound to be reduced is first preferably dissolved in a solvent. As disclosed in my Patent 2,894,036 of July 7, 1959, this solvent is preferably one which is capable of dissolving at the desired operating conditions, both the aromatic dinitro compound used as a feed stock, as well as the products formed in its catalytic hydrogenation, i.e., water and the desired aromatic diamine, so that a homogenous single liquid phase is maintained throughout the reaction. A small amount of catalyst, preferably used catalyst from a previous run which has lost much of its activity, is then added to the charge. The charge is then maintained at the desired reaction temperature, usually in the range of 40–100° C. and under a hydrogen pressure of from atmospheric to 150 p.s.i.g., and preferably 25 to 80 p.s.i.g. with good agitation until from about 1% to about 10% of theory of hydrogen has been absorbed. The catalyst is then removed from the charge and a small amount of fresh catalyst added and hydrogenation then continued at desired reaction temperature and suitable hydrogen pressure until the reduction is complete. While ordinarily the reduction would be continued until the diamine corresponding to the dinitro compound used in the charge is obtained, it has been found in practicing the present invention that the reduction of nitro groups of aromatic dinitro compounds proceeds in a substantially step-wise manner so that when reducing the aromatic dinitro compound, there is first obtained in the reaction a material containing essentially the monoamino mono-nitro product, and, if desired, the process may be stopped at this point so as to obtain a product in which only one of the nitro groups has been reduced.

As previously stated, the conditions both for the pre-hydrogenation and hydrogenation steps in the present process are those known in the art for the catalytic hydrogenation of aromatic dinitro compounds. As solvents which may be used for the reaction may be mentioned morpholine, N-alkyl morpholines, butyrolactone, ethylenediamine, piperidine, N-alkyl piperidine, pyridine, N, N'-dialkylamides, such as dimethyl formamide and dimethyl acetamide, pyrrolidone, methyl pyrrolidone, ethyl ether of ethylene glycol ("Cellosolve"), methyl ether of ethylene glycol ("methyl Cellosolve"), ethyl ether of diethylene glycol ("Carbitol"), methyl ether of diethylene glycol ("methyl Carbitol"), dimethyl ether of ethylene glycol, diethyl ether of ethylene glycol, dimethyl or diethyl ethers of diethylene glycol, and monomethyl, monoethyl, dimethyl or diethyl ethers of polyethylene glycols. All of these solvents may be used along, in admixtures with each other, or diluted with water.

I particularly prefer as a solvent an aqueous solution of an aromatic diamine product of the reaction. In the reduction of dinitro compounds to the corresponding diamines, for each mole of dinitro compound there is formed one mole of corresponding diamine and four moles of water, and this aqueous diamine obtained as product of the reaction is a particularly preferred solvent, as more fully described in copending application of Graham, Freyermuth and Hort, Serial No. 825,068, filed July 6, 1959. Alternatively, if desired, while the diamine and water product of the reaction in the proportions in which they are formed in the reaction is particularly preferred as the solvent, it will be understood that the diamine product of the reaction diluted with sufficient water, about 15 to 50% by weight so as to form a liquid solvent is equally effective. The presence of water is preferred when diamine is used as solvent, as many of the aromatic diamines formed on the reduction of aromatic dinitro compounds are water-soluble, but are usually solid at desirable temperatures of the reaction, so that the undiluted diamine not being a liquid would not be suitable as a solvent.

The remaining conditions employed for the catalytic hydrogenation of the aromatic dinitro compounds are those known in the art; i.e., temperatures of 20° C. to 100° C., or slightly higher, are employed. Lower temperatures are less desirable, since the reaction becomes excessively slow, and above 100° C. undesired reactions, such as hydrogenolysis, ring hydrogenation, and polymerization may take place. Optimum temperatures and pressures of reaction may be obtained for each specific dinitro compound, and the particular catalyst employed. However, in general, it has been found that satisfactory reaction rate is obtained within the range of 40 to 100° C. At 100° C. some decomposition of the diamine may take place, although this usually does not become serious, or hazardous until temperatures above 100° C. are reached.

The pressure employed for the reaction is preferably about 25 to 80 pounds per square inch gauge; although pressures from about atmospheric to about 150 pounds per square inch gauge may be used.

The catalysts which are preferably employed in the reduction comprise nickel and the platinum metals' group of the periodic system; preferably palladium and platinum —either supported on carriers, or unsupported. Any of the standard preparations of catalysts may be used. The supported catalysts may be pelleted, granular or powdered. The catalysts may be on the outside of the support or through it. Some of the useful catalysts which may be employed together with references to their preparation are given below:

Platinum black—Sabatier-Reid, Catalysis in Organic Chemistry, D. Van Nostrand Co., New York, 1922.
Platinum oxide—Adams, Voorhees and Shriner, Organic Syntheses, Coll. vol. 1, p. 452, John Wiley & Sons, New York, 1932.

Raney nickel—Covert, J. Am. Chem. Soc., 54, 4116 (1952).
Palladium on charcoal—Mannich & Thiele, Ber. deutches pharm. Ges., 26, 36–48 (1916).
Platinum on charcoal—Ellis, U.S. Patent 1,174,245.
Nickel on kieselguhr—Covert and Conner, J. Am. Chem. Soc., 54, 165 (1932).
Platinum or palladium on alumina—Schwarcman, U.S. Patent 1,111,502.

The details of the present invention will be apparent to those skilled in the art from consideration of the following specific examples in which the parts are by weight.

*Example 1*

400 g. of a 20% solution of 1,3-dinitrobenzene in dimethyl formamide was charged to a 1 liter steel shaker type autoclave, along with 2 g. of a commercial 5% palladium on charcoal catalyst. The system was purged of air with hydrogen gas and hydrogen gas was then fed in with shaking to maintain pressure of 50 p.s.i.g. The temperature was maintained at 50° C. After ⅓ hour, approximately 8% of the theoretical hydrogen had been absorbed as evidenced by measurement of pressure drop from a reservoir. Hydrogenation was then stopped and the catalyst removed by filtration. The partially hydrogenated material was recharged to the autoclave (as the sole dinitro material charged thereto) and 1 g. of fresh catalyst from the same batch of the 5% palladium on charcoal catalyst added thereto. The system was again purged of air with hydrogen gas, and hydrogen gas fed in with shaking to maintain a hydrogen pressure of 50 p.s.i.g. The temperature was maintained at 50° C. until hydrogenation was complete. There was obtained a yield of 98+% 1,3-diaminobenzene.

During the prehydrogenation step described above, the rate as measured by pressure drop from a reservoir was 300 pounds pressure in an hour for the 2 g. of catalyst used. After removal of this catalyst and replacement with 1 g. of fresh catalyst, the hydrogenation rate on continuation of the reduction was such that the pressure drop was 400 pounds per hour. On completion of the reduction, the catalyst which was recovered was found to be still active and was used in subsequent hydrogenations.

*Example 2*

The procedure of Example 1 was followed, but instead of 400 g. of a 20% solution of 1,3-dinitrobenzene in dimethyl formamide, there was used 400 g. of a 20% solution of 1,3-dinitrobenzene in the monomethyl ether of ethylene glycol (methyl "Cellosolve"). The results obtained were similar in all respects to those obtained in Example 1.

*Example 3*

The procedure of Example 1 was again repeated employing, however, instead of dimethyl formamide as the solvent, the products of the reaction, i.e., a mixture of 60 parts by weight of metaphenylene diamine and 40 parts by weight of water so that the charge to the autoclave was 80 g. of 1,3-dinitrobenzene, 192 g. of meta phenylene diamine and 128 g. of water to which there was added 2 g. of a 5% palladium in charcoal catalyst. Hydrogenation was effected at 50° C. and under a hydrogen pressure of 50 p.s.i.g. until 8% of the theoretical hydrogen had been absorbed (in about ¼ hour) after which the catalyst was removed and 1 g. of fresh catalyst added and hydrogenation again continued (of the thus treated dinitro material in the absence of any untreated dinitro material) at 50° C. and 50 p.s.i.g. of hydrogen pressure to completion. The results obtained were in all respects similar to those obtained in Example 1, i.e. the yield of meta-phenylene diamine was in excess of 98% and the rate during the prehydrogenation step was such that the pressure drop during the prehydrogenation step as measured by pressure drop from a reservoir was 300 pounds per hour and the rate during the main hydrogenation step was such that the pressure drop was 400 pounds per hour.

*Example 4*

Example 2 was again repeated, except that after the prehydrogenation step there was added 2 g. of fresh palladium on charcoal catalyst and hydrogenation was then continued at 50° C. and 50 p.s.i.g. hydrogen pressure. In this example the rate of hydrogenation as measured by pressure drop from a reservoir was 800 pounds per hour.

*Example 5*

In this example, the aqueous meta-phenylene diamine obtained as a product of reduction, i.e., the product of 60 parts by weight of meta-phenylene diamine and 40 parts by weight of water, was employed as the solvent so that the charge to the catalyst was 80 g. of 1,3-dinitrobenzene, 192 g. of meta-phenylene diamine and 128 g. of water. To this there was added 1 g. of a one-half percent platinum on alumina catalyst. After purging the system of air with hydrogen gas, prehydrogenation was effected at 50° C. and at a hydrogen pressure of 50 p.s.i.g. until 3% of the theoretical hydrogen had been absorbed (in about 20 minutes). The catalyst was then removed and 1 g. of fresh one-half percent platinum on alumina catalyst added and hydrogenation continued to completion under the same conditions, i.e., 50° C. and 50 p.s.i.g. hydrogen pressure. The yield of meta-phenylene diamine obtained in this experiment was in excess of 98% of theory and during the prehydrogenation step the rate of hydrogenation as indicated by pressure drop in the reservoir was 100 pounds per hour, while the rate in the main hydrogenation step after removal of the original catalyst and addition of fresh catalyst was 150 pounds pressure drop per hour.

*Example 6*

Example 5 was again repeated, except that the catalyst employed during the prehydrogenation step was used catalyst which had been used in a series of 8 catalytic hydrogen reduction of 1,3-dinitrobenzene, during which the time required for complete hydrogenation had increased from 1 hour for the first run of the series to 16 hours for the last run of the series. Hydrogenation was continued during the prehydrogenation step until 3% of the theoretical hydrogen had been taken up. The rate indicated by pressure drop in the reservoir was 25 pounds per hour. The catalyst was then removed and 1 g. of fresh catalyst added and hydrogenation continued to completion at 50° C. and a hydrogen pressure of 50 p.s.i.g. during which period the rate as measured by pressure drop was 150 pounds per hour.

It should be understood that the foregoing examples are illustrative of preferred embodiments of the present invention and that various modifications therein will suggest themeselves to those skilled in the art. In particular, the pressure and temperature employed for both the prehydrogenation step and main hydrogenation step may be varied within the ranges previously indicated. Also it should be understood that while the examples given above are limited to the reduction of 1,3-dinitrobenzene to metaphenylene diamine that the process of the present invention is applicable to the reduction of other dinitro aromatic compounds to the corresponding diamino aromatic compounds. Specifically, the process of the present invention has been applied in the same manner as described in the foregoing examples to the reduction of 1,4-dinitrobenzene to para-phenylene diamine with essentially the same results. It has also been applied again with essentially the same results to the reduction of dinitro toluene to the corresponding tolylene diamines. Specific dinitro toluenes which have been converted to corresponding tolylene diamines are 2,4-niditro toluene, 2,6-dinitro toluene and mixtures of 2,4-dinitro toluene and 2,6-dinitro toluene.

As previously explained, the precise reason for the improved rate of reduction and prolongation of the catalyst life resulting from prehydrogenation treatment in accordance with the present invention is not fully understood. However, it appears that this may be due to removal during the prehydrogenation treatment of small amounts of materials which inhibit or adversely affect the catalysts. It has been found that only a small amount of hydrogenation need be effected during the first step of the present invention, and, if the improvement is due to removal of trace impurities, it appears that these are the first materials to be reacted or removed during the prehydrogenation step. Thus, even a prehydrogenation treatment such that only a fraction of 1% of the theoretical hydrogen is absorbed during it, is sufficient to effect improvement in the rate of reduction and prolongation of the catalyst life on subsequent hydrogenation. The results obtained, however, by effecting even a very slight hydrogenation are much better than can be obtained by merely heating the dinitro compound to be reduced along with catalyst but in the absence of hydrogen. While a prehydrogenation treatment in which more than 10% of the hydrogen is absorbed could be used, from an economic standpoint prehydrogenation to a greater extent that 10% is ordinarily unwarranted.

I claim:

1. In a process for the catalytic hydrogen reduction of aromatic dinitro compounds to form the corresponding diamine compounds, wherein a solution of the dinitro compound to be reduced in an inert solvent while agitated is reacted with hydrogen at a temperature of 40–100° C. and a pressure of from atmospheric to 150 p.s.i.g. in a hydrogenation zone in the presence of a hydrogenation catalyst selected from the group consisting of nickel and the platinum metals, the improvement of first hydrogenating the dinitro compound to be reduced until a minor amount from about 1% up to about 10% by weight of theory of the hydrogen required for complete reduction of said dinitro compound has been absorbed, thereafter removing the catalyst from the dinitro material being hydrogenated, adding fresh catalyst to the thus treated dinitro material and then continuing said hydrogenation of the thus treated dinitro material in the absence of any untreated dinitro material.

2. The process as defined in claim 1 wherein the catalyst employed in the first hydrogenation step specified is used catalyst which has been recovered from a previous second hydrogenation step specified in said claim 1.

3. The process as defined in claim 1 wherein the inert solvent specified is a solvent for the dinitro compound to be reduced and also for the polyamine and water formed in the hydrogenation, whereby a single phase liquid solution of said solvent, dinitro compound corresponding diamine and water are maintained in the reaction zone throughout the reduction.

4. The process as defined in claim 1 wherein the aromatic dinitro compound specified is a member of the group consisting of dinitrobenzene and dinitrotoluene.

5. The process as defined in claim 4 wherein the inert solvent specified is a solvent for the dinitro compound to be reduced and also for the diamine and water formed in the hydrogenation, whereby a single phase liquid solution of such solvent, dinitro compound, corresponding amine and water are maintained in the reaction zone throughout the reduction.

No references cited.

CHARLES B. PARKER, *Primary Examiner.*